United States Patent
Hergeth et al.

(10) Patent No.: US 12,152,558 B2
(45) Date of Patent: Nov. 26, 2024

(54) DEVICE AND METHOD FOR AUTOMATICALLY SWITCHING OFF AND STARTING A DRIVE MACHINE

(71) Applicant: Bayerische Motoren Werke Aktiengesellschaft, Munich (DE)

(72) Inventors: Sebastian Hergeth, Munich (DE); Frederik Naujoks, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 5 days.

(21) Appl. No.: 17/921,380

(22) PCT Filed: Jun. 14, 2021

(86) PCT No.: PCT/EP2021/065938
§ 371 (c)(1),
(2) Date: Oct. 26, 2022

(87) PCT Pub. No.: WO2022/008172
PCT Pub. Date: Jan. 13, 2022

(65) Prior Publication Data
US 2023/0204007 A1    Jun. 29, 2023

(30) Foreign Application Priority Data
Jul. 9, 2020 (DE) .................... 10 2020 118 075.6

(51) Int. Cl.
*F02N 11/08* (2006.01)
*F02D 29/02* (2006.01)

(52) U.S. Cl.
CPC .......... *F02N 11/0837* (2013.01); *F02D 29/02* (2013.01); *F02N 2200/125* (2013.01)

(58) Field of Classification Search
CPC .. F02D 29/02; F02N 11/0837; F02N 2200/12; F02N 2200/125
See application file for complete search history.

(56) References Cited

U.S. PATENT DOCUMENTS 6,091,325 A * 7/2000 Zur ................. H02J 7/14
                                                 340/661
9,156,461 B2 * 10/2015 Kaihara .............. B60K 6/48
(Continued)

FOREIGN PATENT DOCUMENTS

DE   10 2008 000 629 A1   9/2009
DE   10 2008 042 306 A1   4/2010
(Continued)

OTHER PUBLICATIONS

WO2009112105A2—Method for operating hybrid systems—Google Patents (Year: 2009).*
(Continued)

*Primary Examiner* — Carl C Staubach
(74) *Attorney, Agent, or Firm* — Crowell & Moring LLP

(57) ABSTRACT

A device and method automatically switches off and starts a drive machine in a motor vehicle. The device includes a sensor unit for sensing a noise level and/or a vibration level of the environment of the motor vehicle and an electronic control unit for controlling an engine start-stop automatic system. The signals of the sensor unit are captured and are compared with at least one defined threshold value. The drive machine is automatically switched off when a predefined condition exists. The drive machine, having been automatically switched off, is automatically started again at the latest when the signals of the sensor unit exceed the at least one defined threshold value.

7 Claims, 1 Drawing Sheet

(56) References Cited

U.S. PATENT DOCUMENTS

| | | | |
|---|---|---|---|
| 9,966,057 B1 | 5/2018 | Wang | |
| 2014/0265480 A1* | 9/2014 | Perrin | B60N 2/26 297/217.4 |
| 2015/0275840 A1 | 10/2015 | Sawada | |
| 2016/0014506 A1* | 1/2016 | Tanaka | H04R 3/005 381/92 |
| 2016/0215747 A1 | 7/2016 | Huber et al. | |
| 2018/0326982 A1* | 11/2018 | Paris | B60W 30/18154 |
| 2019/0108692 A1* | 4/2019 | Du | B60W 50/14 |
| 2019/0360446 A1* | 11/2019 | Chae | B60W 30/17 |
| 2020/0201356 A1* | 6/2020 | Schuh | G05D 1/028 |
| 2021/0300367 A1* | 9/2021 | Yamashita | B60W 30/17 |
| 2021/0350160 A1* | 11/2021 | Chapman | G06V 20/52 |

FOREIGN PATENT DOCUMENTS

| | | |
|---|---|---|
| DE | 10 2012 217 899 A1 | 6/2014 |
| DE | 10 2015 104 022 A1 | 10/2015 |
| DE | 10 2015 201 344 A1 | 6/2016 |
| DE | 10 2017 216 380 A1 | 3/2019 |
| JP | 2006-9750 A | 1/2006 |
| JP | 2006-57456 A | 3/2006 |
| WO | 2009/092481 A1 | 7/2009 |
| WO | WO2009112105 A2 * | 9/2009 ............ B60W 20/00 |

OTHER PUBLICATIONS

International Search Report (PCT/ISA/210) issued in PCT Application No. PCT/EP2021/0659938 dated Sep. 17, 2021 with English translation (four (4) pages).

German-language Written Opinion (PCT/ISA/237) issued in PCT Application No. PCT/EP2021/0659938 dated Sep. 17, 2021 (six (6) pages).

German-language Search Report issued in German Application No. 10 2020 118 075.6 dated Feb. 12, 2021 with partial English translation (10 pages).

Chinese-language Office Action issued in Chinese Application No. 202180029208.4 dated Nov. 28, 2023 with English translation (13 pages).

* cited by examiner

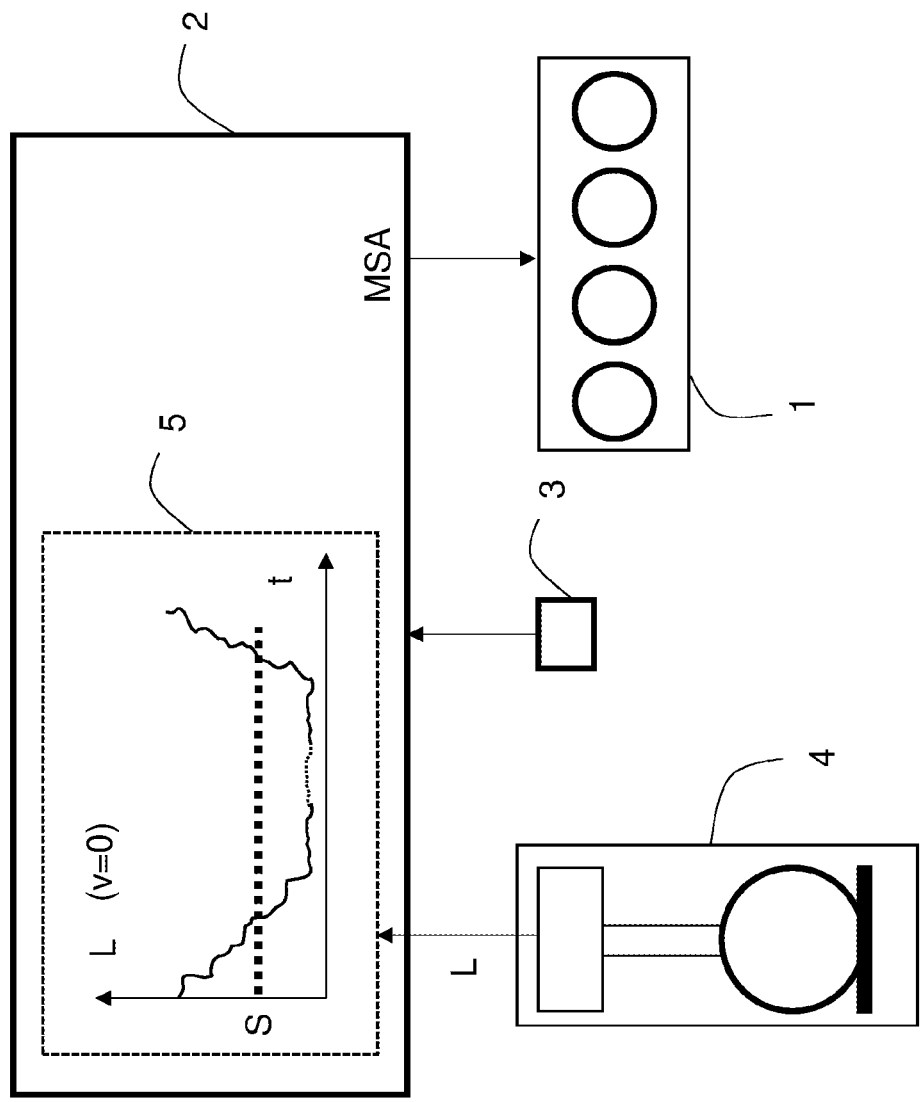

DEVICE AND METHOD FOR AUTOMATICALLY SWITCHING OFF AND STARTING A DRIVE MACHINE

BACKGROUND AND SUMMARY

The invention relates to a device and to a method for automatically switching off and starting a drive machine, in particular an internal combustion engine, in a motor vehicle.

Internal combustion engines are usually switched on and off manually by the driver using an ignition key or using a start/stop button. One exception is a method referred to as automatic engine start/stop (MSA) which is presented, for example, in DE 10 2012 217 899 A1.

In order to reduce fuel consumption and pollutant emissions, methods and systems are currently being developed and employed which, when the vehicle is at a standstill, automatically switch off the internal combustion engine of a motor vehicle under certain circumstances or when prescribed switch-off conditions exist and automatically switch on the internal combustion engine again when prescribed switch-on conditions exist. Methods and systems or start/stop devices of this kind are suitable primarily for reducing fuel consumption in city traffic since, in city traffic, the vehicle frequently comes to a stop at traffic lights or due to heavy traffic (traffic jam situation) and operation of the internal combustion engine is not required.

Here, the internal combustion engine is automatically switched off when the vehicle is braked to a standstill and is kept at a standstill by actuating the brake pedal. The internal combustion engine is restarted only when the accelerator pedal is actuated or when imminent actuation of the accelerator pedal is identified by means of a footwell monitoring unit. In this way, the engine is also partially controlled or restarted as soon as the driver takes their foot off the brake (in the case of automatic transmissions) or depresses the clutch and selects a gear by moving the shift lever (in the case of manual transmissions).

The object of the invention is then to provide a method in which firstly fuel is saved by automatically switching off and starting up the drive machine of a vehicle but at the same time the requisite drive power is also ensured as required.

According to the invention, this object is achieved by the features of the independent patent claims. Advantageous developments are the subject matter of the dependent claims.

The invention relates to a device and to a method for automatically switching off and starting a drive machine in a motor vehicle, comprising a sensor unit for detecting a noise and/or a vibration level (e.g. in the form of a volume level) in the area surrounding the motor vehicle and comprising an electronic control unit for controlling an automatic engine start/stop system. According to the invention, the signals (i.e. the respectively current noise and/or vibration level or the physical variables for detecting the respectively current noise and/or vibration level) from the sensor unit are detected and compared with at least one defined threshold value. The drive machine is automatically switched off when a prescribed condition exists, after which the drive machine, which has been automatically switched off, is automatically started again at the latest when the signals from the sensor unit or the noise and/or vibration level overshoot the at least one threshold value.

For this purpose, the control unit is configured with a detection and evaluation unit by way of which the noise in the area surrounding the motor vehicle (ego vehicle) and/or the vibrations transmitted to the ego vehicle via the roadway are detected, by way of which the at least one defined threshold value is stored and by way of which the respectively detected noise and/or vibration level are/is compared with the defined threshold value.

A prescribed condition is preferably a vehicle speed of at least virtually zero and/or the signals from the sensor unit undershooting the at least one threshold value.

The invention is based on the following considerations.

Start/stop systems for internal combustion engines switch off the engine in certain situations and switch on the engine again only when the vehicle starts up again (e.g. when the accelerator pedal is actuated) or in the case of some other vehicle-related requirement (e.g. when the battery has been discharged to below a prescribed threshold). A customary situation is, in particular, a vehicle being at a standstill for a relatively long period of time, such as e.g. when waiting at a traffic light. On account of being switched off, systems of this kind can contribute to an increase in efficiency. However, slight losses in comfort may sometimes occur owing to the engine being switched on with a time delay after the request is made by the driver. This applies, inter alia, when the engine is rapidly started up after previously having been switched off.

The invention relates to optimization of the switch-off period using the information relating to the area surrounding the vehicle. Acoustic signals and/or vibrations transmitted by the roadway surface in the area surrounding the stationary vehicle primarily serve as a basis. The current traffic situation is analyzed and the best-possible start point and end point for the automatic start/stop is ascertained using this measurement data.

The switch-off period is configured to be as long as necessary and as short as possible. This ensures the best-possible compromise between maximum efficiency and maximum comfort. This is intended to be achieved by way of the optimum time for switching on the engine again being derived from information relating to the surrounding area. Here, acoustic signals and/or vibrations of the roadway surface allow conclusions to be drawn about the flow of traffic. This leads to a prediction about starting up again and therefore the need to start the engine, before this is requested by the driver. Here, use is made of the fact that the flow of traffic generally comes to a complete stop for a brief moment when a changeover is made in a traffic light phase from red to green or the other way around since red is displayed for all directions of travel in an overlapping manner. The noise level in the surrounding area and also the vibration level of the roadway surface are considerably lower during this period. This can be detected, in particular, by microphones and/or vibration sensors. The idea therefore makes provision for the engine of a vehicle which has been stopped by the automatic start/stop system to then be started again as soon as it is identified from the noise in the surrounding area and/or vibrations in the surrounding area that the cross traffic at a traffic light has come to a standstill and therefore a green phase in the subject vehicle's direction of travel is imminent. Owing to the engine being started at this moment, delay-free start-up can be ensured without the engine having to be started unnecessarily early and while retaining the advantages of an automatic start/stop system. The invention likewise covers, for example, turning on the engine again when, in the case of a traffic jam situation, the noise and/or vibrations created by the vehicles (in the neighbouring lanes and/or several vehicles in front) surrounding the subject vehicle and driving away again increase/increases.

Advantages

More accurate automatic start/stop
Greater comfort during start-up

Rapid power request during start-up

The drawing shows an exemplary embodiment of the invention.

BRIEF DESCRIPTION OF THE DRAWING

The single FIGURE is a schematic block diagram illustrating important components of the device according to the invention and the associated method.

DETAILED DESCRIPTION OF THE DRAWING

A motor vehicle (ego vehicle) has a drive machine 1, in particular an internal combustion engine, a sensor unit 4 for detecting a noise and/or a vibration level L in the area surrounding the motor vehicle, and an electronic control unit 2 for controlling an automatic engine start/stop system MSA. The control unit 2 preferably detects the position of an accelerator pedal 3.

The control unit 2 comprises a detection and evaluation unit 5 for detecting a noise and/or vibration level L, for storing at least one defined threshold value S, and for comparing the detected noise and/or vibration level L with the defined threshold value S. The threshold value S relates, for example, to a volume level L in [dB].

The sensor unit 4 may be a microphone, for example.

The drive machine 1 is automatically switched off when a prescribed condition exists and according to the invention is automatically started again when the signals from the sensor unit 4 or the noise and/or vibration level L overshoot the at least one threshold value S.

A prescribed condition may be a vehicle speed v of at least virtually zero (v=0). Furthermore, a prescribed condition may be an accelerator pedal 3 not being actuated. Finally, a prescribed condition for automatically switching off the drive machine 1 may also be the signals from the sensor unit 4 or the level L undershooting the at least one threshold value S—or else another second threshold value.

The invention claimed is:

1. A device for automatically switching off and starting a drive machine in a motor vehicle, comprising:
a sensor unit for detecting noise and/or vibration level signals in an area externally surrounding the motor vehicle, wherein the noise and/or vibration level signals are indicative of a change in traffic flow in all directions relative to the motor vehicle; and
an electronic control unit for controlling an automatic engine start-stop system, the electronic control unit being operatively configured to:
detect the signals from the sensor unit and compare said signals with at least one defined threshold value,
automatically switch off the drive machine when a prescribed condition exists, and
automatically start again the drive machine, which has been automatically switched off, when said signals from the sensor unit detected at a standstill of the motor vehicle overshoot the at least one defined threshold value.

2. The device according to claim 1, wherein the prescribed condition is a vehicle speed of substantially zero.

3. The device according to claim 1, wherein the prescribed condition is said signals from the sensor unit undershooting the at least one defined threshold value.

4. A method for automatically switching off and starting a drive machine in a motor vehicle, the method comprising:
detecting, via a sensor unit, noise and/or vibration level signals in an area externally surrounding the motor vehicle, wherein the noise and/or vibration level signals are indicative of a change in traffic flow in all directions relative to the motor vehicle; and
controlling, via an electronic control unit, an automatic engine start-stop system, wherein
the signals from the sensor unit are detected and compared with at least one defined threshold value,
the drive machine is automatically switched off when a prescribed condition exists, and
the drive machine, which has been automatically switched off, is automatically started again when the signals from the sensor unit detected at a standstill of the motor vehicle overshoot the at least one defined threshold value.

5. The method according to claim 1, wherein the prescribed condition is a vehicle speed of substantially zero.

6. The method according to claim 1, wherein the prescribed condition is said signals from the sensor unit undershooting the at least one threshold value.

7. A control unit, comprising:
an electronic control unit for automatically switching off and starting a drive machine in a motor vehicle, the electronic control unit comprising a detection and evaluation unit that:
detects a noise and/or vibration level in an area externally surrounding the motor vehicle, wherein the noise and/or vibration level signals are indicative of a change in traffic flow in all directions relative to the motor vehicle,
stores a defined threshold value, and
compares the detected noise and/or vibration level with the defined threshold value so as to:
automatically switch off the drive machine when a prescribed condition exists, and
automatically start again the drive machine, which has been automatically switched off, when the noise or vibration level detected at a standstill of the motor vehicle overshoots the defined threshold value.

* * * * *